US007310711B2

(12) United States Patent
New et al.

(10) Patent No.: US 7,310,711 B2
(45) Date of Patent: Dec. 18, 2007

(54) HARD DISK DRIVE WITH SUPPORT FOR ATOMIC TRANSACTIONS

(75) Inventors: Richard New, San Jose, CA (US); James Shipman, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 430 days.

(21) Appl. No.: 10/976,650

(22) Filed: Oct. 29, 2004

(65) Prior Publication Data

US 2006/0095659 A1 May 4, 2006

(51) Int. Cl.
*G06F 12/16* (2006.01)
(52) U.S. Cl. .................................. 711/154; 711/112
(58) Field of Classification Search ................. 711/112, 711/113, 162, 203, 154; 707/202; 709/248; 714/19
See application file for complete search history.

(56) References Cited

U.S. PATENT DOCUMENTS

| | | | | |
|---|---|---|---|---|
| 5,345,575 | A | * | 9/1994 | English et al. ............... 711/112 |
| 5,832,515 | A | * | 11/1998 | Ledain et al. ................ 707/202 |
| 5,996,054 | A | * | 11/1999 | Ledain et al. ................ 711/203 |
| 6,378,037 | B1 | | 4/2002 | Hall |
| 7,010,645 | B2 | * | 3/2006 | Hetzler et al. ............... 711/113 |
| 7,111,136 | B2 | * | 9/2006 | Yamagami .................... 711/162 |
| 7,111,197 | B2 | * | 9/2006 | Kingsbury et al. ........... 714/19 |
| 7,185,227 | B2 | * | 2/2007 | Eguchi et al. ................ 714/15 |
| 2002/0078244 | A1 | * | 6/2002 | Howard ....................... 709/248 |
| 2004/0128470 | A1 | | 7/2004 | Hetzler et al. |

* cited by examiner

*Primary Examiner*—Matthew Kim
*Assistant Examiner*—Paul Schlie
(74) *Attorney, Agent, or Firm*—Townsend and Townsend and Crew LLP; Patrick Duncan

(57) ABSTRACT

Embodiments of the present invention provide a data storage apparatus with new features to more easily enable atomic transactions. Rather than having the host system issue the multiple logging commands to the data storage apparatus, the data storage apparatus can be modified so that it can perform the logging function itself. In one embodiment, a data storage controller of a data storage apparatus for implementing an atomic transaction comprises a receiving module configured to receive from a host one or more commands to be executed as an atomic transaction; a log recording module, configured to record in a nonvolatile storage a log containing the one or more commands of the atomic transaction, the log to be administered by the data storage controller and not by the host; and an execution module configured to perform the one or more commands of the atomic transaction.

24 Claims, 3 Drawing Sheets

HARD DISK DRIVE WITH SUPPORT FOR ATOMIC TRANSACTIONS

CROSS-REFERENCES TO RELATED APPLICATIONS

NOT APPLICABLE

BACKGROUND OF THE INVENTION

This invention relates generally to storage devices and, more particularly, to a method and an apparatus for enabling atomic transactions on a hard disk drive.

Atomic transactions are frequently used in concurrent systems and in database applications and desktop file systems. An atomic transaction is a transaction that has the properties of atomicity, consistency, isolation, and durability. For atomicity, the transaction has to be completed either fully or not at all. For consistency, the transaction, when completed, will leave the system in a self-consistent state. For isolation, the transaction should appear to execute completely alone, without interference from other processes which have access to the same shared resources such as memory. For durability, the results of the completed transaction should be recorded in nonvolatile storage. A more detailed description of an atomic transaction can be found in a number of computer science textbooks, such as "Concurrent Systems: An Integrated Approach to Operating Systems, Database, and Distributed Systems" by Jean Bacon. The notion of an atomic operation is useful in two main areas: i) concurrent systems with shared resources, and ii) mission critical systems which require protection against system crashes and unscheduled power outages.

The classic concurrent system problem is an airline reservation system in which multiple booking agents may be simultaneously trying to book airline tickets for different customers. As an example, consider an itinerary consisting of multiple consecutive flights, for example a flight from San Francisco to New York, and then on to London. The booking agent must successfully book either both legs of the flight or neither. In other words, the booking of the combined flight from San Francisco to London must be performed as an atomic operation. This system can be considered a concurrent system in which multiple processes (booking agents) are active at the same time, accessing shared resources (airline seats).

Another classic example would be a banking system in which two agents are trying to simultaneously increment the bank balance of a single customer. Each agent reads the current bank balance, and then overwrites it with a larger balance. If these two operations (reading and rewriting) from each agent are interleaved, then the bank balance will only end up being incremented once, instead of twice as it should be. To solve this problem, it is a requirement that the operations of each agent (reading and rewriting) be implemented atomically. Each agent needs to "lock" the bank account while the update is performed so that no other agent can simultaneously access the account. This may be accomplished in several well known methods, including through the use of semaphores.

The second main use of atomic operations occurs in mission critical systems which require some form of protection against system crashes or unscheduled power outages. Again, to consider the example of a bank, imagine that funds are transferred from one account to another. First, the funds are removed from one account, and then added to another. If the system crashes in the middle of this operation then the first account will be debited but the second account will never get credited. Again, the solution is to combine the debit and credit operations into a single operation which must be executed atomically (that is, either in full or not at all). In practice, this is accomplished through transaction logging.

Consider a computing system which must be protected against software crashes, hardware failure events, and power outages. It can be assumed that these events may destroy the contents of any volatile storage (for example Random Access Memory or RAM) in the system, but not the contents of the nonvolatile storage (disk drives, battery backed up RAM, tape, etc.). While errors may also damage nonvolatile storage, it is assumed that this is dealt with through the redundant storage of information (e.g. RAID).

To provide protection against such crash events, it must be guaranteed that at every instant in time for the duration of the transaction, there is sufficient information recorded in nonvolatile storage so that the data can be reconstructed and the transaction can be completed after a crash. This is generally accomplished through logging of transactions. For each atomic transaction to be executed, the details of the transaction are first written to nonvolatile storage in a log. Then the transaction itself is executed. And finally, after the transaction has been completed successfully, the log entry may be updated to indicate that the transaction was completed. For a banking system transferring money from one account to another, the first step would be to log in the nonvolatile storage the intent to perform the transfer, then actually perform the transfer (updating both account balances in nonvolatile memory), and then update the log to indicate successful completion of the operation. If a crash occurs at any point in this operation, there must be enough information in the nonvolatile storage to complete the intended sequence of operations, regardless of when the crash event occurred.

Many modern computer file systems make use of transaction logging to provide integrity against software and hardware failures and power outages. In addition to storing user data on a hard disk drive, file systems store metadata which consists of information about the directory structure of the files on the disk, and pointers to the various blocks of data which make up each user file. When a user file is updated, both the user data and the file system metadata must be updated on the hard disk drive. For example, if a user appends data to a file, some new data blocks on the disk drive must be allocated, the new user data must be written to these blocks, and the file system metadata must be updated to point to these new data blocks. If a crash or power failure should occur in the midst of these operations, then the file system can be left in an inconsistent state; that is, the metadata may not accurately reflect the arrangement of user data blocks on the disk.

To avoid this problem, file systems make use of atomic transactions. When a user updates a file, all of the operations associated with that action (allocation of new blocks, writing of new user data, updating of metadata) are grouped into a single composite operation which must be executed atomically (in full or not at all). To guarantee that such transactions are executed atomically, many modern desktop computer file systems use transaction logging. Such file systems are often called journaling file systems (where journal is simply another name for log).

When an atomic transaction is written to the log, there are several different types of information that one may decide to store in the log. If the file system metadata only is logged, then the updates to the file system metadata can always be executed atomically. Thus, in the event of a system crash, the changes to the metadata can be completed upon reboot. If only the file system metadata is logged, then there can be no guarantees on the integrity of the user data, and some user data may be lost during a crash. If in addition to logging file system metadata, the new user data is also logged, then one can guarantee that the entire transaction (metadata and user data) can be completed properly after reboot following a crash. If the metadata, the new user data, and the old user data which is being overwritten is logged, then one can guarantee not only that the transaction will be completed, but also that the transaction can be reversed. This may be useful since it allows atomic transactions to be broken down into subcomponents which can be executed separately.

When such journaling is implemented, it is generally done at the file system level. This means that any operations performed on the log data structure on the hard disk are initiated by the file system, which runs on the host computer. Thus, rather than simply writing user data and metadata to the drive, the host also executes the commands required to log the atomic transaction, and to close out the transaction when it has been fully completed.

BRIEF SUMMARY OF THE INVENTION

Embodiments of the present invention provide a data storage apparatus with new features to more easily enable atomic transactions. Rather than having the host system issue the multiple logging commands to the data storage apparatus, the data storage apparatus can be modified so that it can perform the logging function itself. The data storage apparatus records one or more commands of an atomic transaction in a nonvolatile log which is administered by the data storage apparatus and not by the host. The data storage apparatus then performs the atomic operation without relying on the host.

In accordance with an aspect of the present invention, a method of implementing an atomic transaction in a data storage apparatus comprises receiving, from a host by the data storage apparatus, one or more commands to be executed as an atomic transaction; recording in a nonvolatile storage, by the data storage apparatus, a log containing the one or more commands of the atomic transaction, the log to be administered by the data storage apparatus and not by the host; and performing the one or more commands of the atomic transaction by the data storage apparatus.

In some embodiments, the method further comprises, prior to receiving the one or more commands to be executed as an atomic transaction, receiving, from the host by the data storage apparatus, an initiate-atomic-operation command identifying the one or more commands to be executed as an atomic transaction. In this case, each command can be issued using ATA, SCSI, or other interface protocol. Alternatively, the one or more commands are linked by setting a parameter in a command field of each command to link the one or more commands together as the atomic transaction to be executed in full or not at all. The one or more commands to be executed as an atomic transaction may each be embodied in a SCSI Command Descriptor Block including a link bit which is set to link the one or more commands together as the atomic transaction.

In specific embodiments, the log is provided in a nonvolatile storage medium in the data storage apparatus, which may be on a surface of a disk in the data storage apparatus or some other storage medium. The method may further comprise notifying the host that the atomic transaction is committed after all of the one or more commands of the atomic transaction are recorded in the log. The method may further comprise recording in the log that the atomic transaction is committed after all of the one or more commands of the atomic transaction are recorded in the log. The method may further comprise providing a plurality of queues of varying priorities including one or more lower priority queues and one or more higher priority queues by the data storage apparatus; placing commands that are committed as low priority commands in the one or more lower priority queues; placing commands that are not committed as high priority commands in the one or more higher priority queues; and performing commands in the one or more higher priority queues first before commands in the one or more lower priority queues.

In some embodiments, the log comprises metadata of the atomic transaction; and the method further comprises keeping the metadata self-consistent by the data storage apparatus. The log may further comprise new user data of the atomic transaction; and the method may further comprise keeping the metadata and the new user data self-consistent by the data storage apparatus. The log may further comprise old user data which can be used to restore the data storage apparatus to a state before the atomic transaction is performed. The method may further comprise receiving one or more non-atomic commands that are interleaved with the one or more commands of the atomic transaction; and separating the non-atomic commands so as to record the one or more commands of the atomic transaction in the log.

In accordance with another aspect of the invention, a data storage controller for implementing an atomic transaction comprises a receiving module configured to receive from a host one or more commands to be executed as an atomic transaction; a log recording module, configured to record in a nonvolatile storage a log containing the one or more commands of the atomic transaction, the log to be administered by the data storage controller and not by the host; and an execution module configured to perform the one or more commands of the atomic transaction.

In some embodiments, the receiving module may be configured to receive from the host, prior to receiving the one or more commands to be executed as an atomic transaction, an initiate-atomic-operation command identifying the one or more commands to be executed as an atomic transaction. Alternatively, the receiving module may be configured to recognize that the one or more commands to be executed as an atomic transaction are each embodied in a SCSI Command Descriptor Block including a link bit which is set to link the one or more commands together as the atomic transaction. A notification module is configured to notify the host that the atomic transaction is committed after all of the one or more commands of the atomic transaction are recorded in the log. The log recording module is configured to record in the log that the atomic transaction is committed after all of the one or more commands of the atomic transaction are recorded in the log. The log comprises metadata of the atomic transaction; and the log recording module is configured to keep the metadata self-consistent. The log may further comprise new user data of the atomic transaction; and the log recording module is configured to keep the metadata and the new user data self-consistent. The log may further comprise old user data; and the log recording module is capable of restoring a data storage apparatus to a state using the old user data before the atomic transaction is performed. The receiving module is configured to receive one or more non-atomic commands that are interleaved with the one or more commands of the atomic transaction; and the log recording module is configured to record the one or more commands of the atomic transaction and not the non-atomic commands in the log. The receiving module is further configured to receive multiple independent overlapping sequences of commands to be issued atomically.

In accordance with another aspect of this invention, a data storage apparatus comprises the above data storage controller; and a nonvolatile storage containing the log. In specific embodiments, the nonvolatile storage is provided on a surface of a disk. The data storage apparatus further comprises a plurality of queues of varying priorities, including one or more lower priority queues and one or more higher priority queues; wherein the log recording module of the data storage controller is configured to record in the log that the atomic transaction is committed after all of the one or more commands of the atomic transaction are recorded in the log; wherein commands that are committed are placed in the one or more lower priority queues and commands that are not committed are placed in the one or more higher priority queues; and wherein the execution module of the data storage controller is configured to perform commands in the one or more higher priority queues first before commands in the one or more lower priority queues.

DETAILED DESCRIPTION OF THE INVENTION

Embodiments of the present invention provide a technique to implement atomic transactions on a hard disk drive, i.e., reconstructing and completing a hard disk drive transaction in the event of a system power failure, host system crash, host system hardware failure, or the like.

Figure 1:
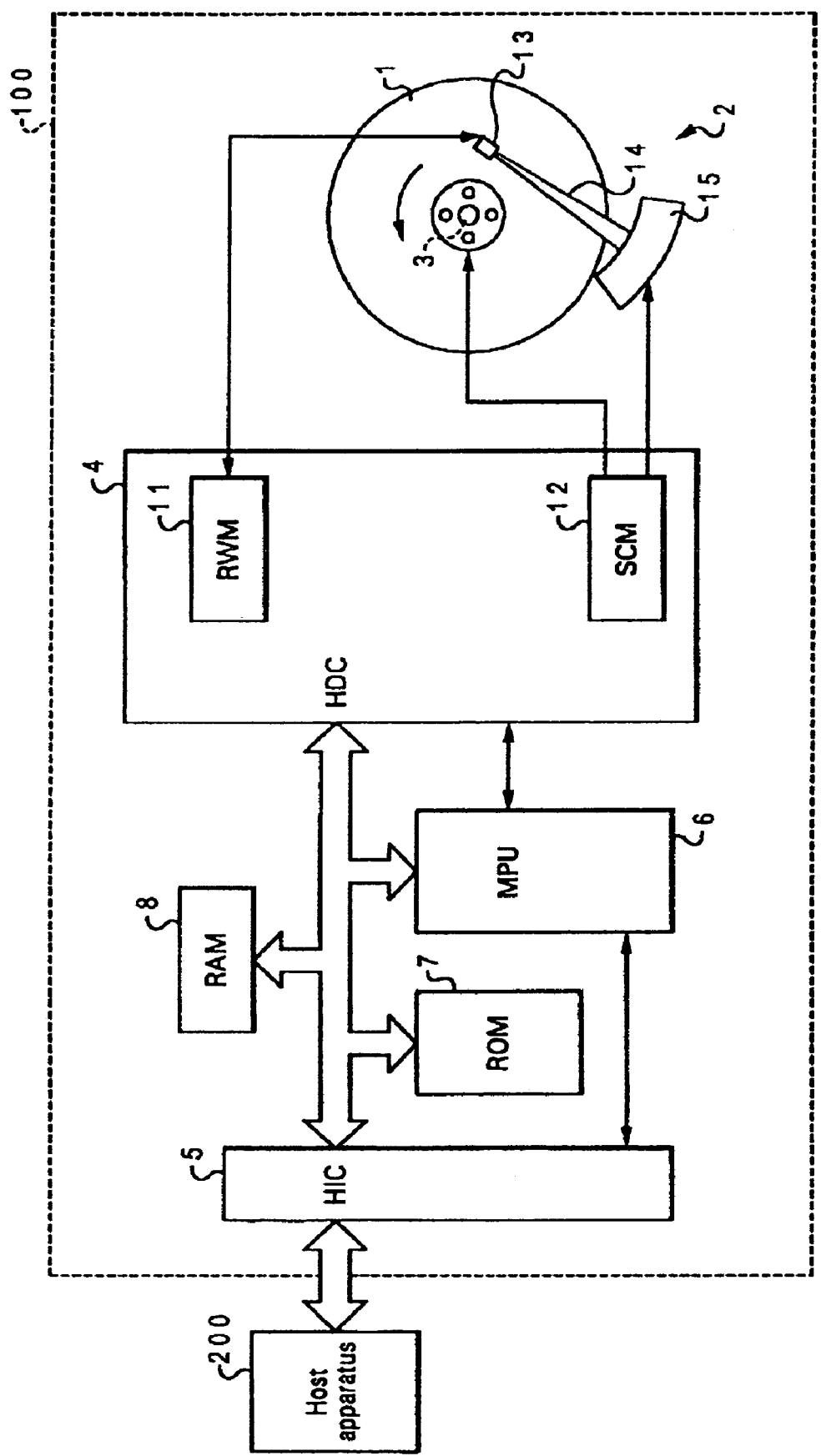
FIG. 1 is a schematic diagram of a system including a host and a hard disk drive apparatus.

FIG. 1 is a block diagram showing an illustrative embodiment of a data storage apparatus such as a disk apparatus 100. The disk apparatus 100 is a hard disk drive (HDD), and includes a disk 1 that is a data recording medium, an access mechanism 2 that rotates over and accesses the disk 1, a spindle motor 3 rotating the disk 1, a hard disk controller (HDC) 4, a host interface controller (HIC) 5 for communicating with a host apparatus 200, a micro processing unit (MPU) 6, ROM 7, and RAM 8. The HDC 4, HIC 5, MPU 6, ROM 7 and RAM 8 are connected with each other via a data bus. A surface of the disk 1 is partitioned into plenty of tracks that are concentric circles. Each track is partitioned into plenty of sectors (data sectors). These sectors are located in the longitudinal direction (circumferential direction) of the track. In each sector, 512 bytes of data (user data) may be recorded, for example.

The access mechanism 2 has a read/write head 13, an arm 14 that has the read/write head 13 at the end thereof, and a voice coil motor (VCM) 15 that rotates the arm 14. This access mechanism 2 accesses the sector and writes data into the sector accessed or reads data from the sector accessed. The HDC 4 has a read/write module (RWM) 11, and a servo control module (SCM) 12. This HDC 4 is hardware that drives the access mechanism 2 and performs the processing relating to an access (read/write of data) to the disk 1. The RWM 11 converts write data into an analog signal at the time of data write and sends the generated write signal to the access mechanism 2. In addition, RWM 11 converts a read signal that is read from the disk 1, by the access mechanism 2 into a digital signal at the time of data read and transfers the generated read data to the RAM 8. The SCM 12 not only drives the spindle motor 3 so that the rotational speed of the disk 1 may follow a target value, but also drives the access mechanism 2 so that the access mechanism 2 may follow a target track on the disk 1.

The HIC 5 is connected to the host apparatus 200 via a two-way communications channel. This HIC 5 is hardware performing the processing relating to data transfer (reception of a read command, a write command, a read address, a write address, and write data, and transmission of read data from the disk 1) with the host apparatus 200. The MPU 6 controls the HDC 4 and HIC 5 according to a micro program (software) stored in the ROM 7, and performs command processing in which commands transmitted from the host apparatus 200 are handled. The micro program is stored in the ROM 7. In addition, in some cases, part of the micro program may be recorded in a special field secured beforehand on a disk surface. In this case, the part of the micro program recorded in the special field is read into the RAM 8 when the disk apparatus 100 is activated. A command queue (storage area) for holding a plurality of commands is provided in the RAM 8, and a command transmitted from the host apparatus 200 is queued into this command queue. In addition, the RAM 8 temporarily holds (caches) the read address, write address, and write data that are received from the host apparatus 200, the read data read from the disk 1, and the like.

Figure 2:
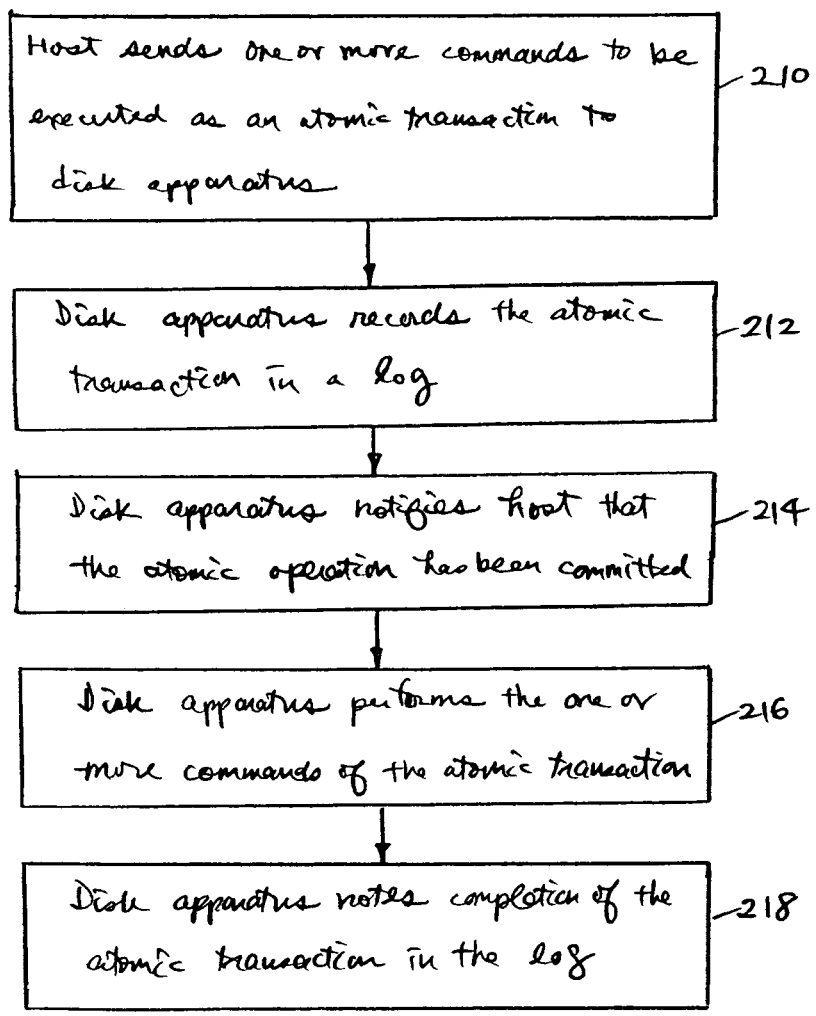
FIG. 2 is a flow diagram illustrating a method of implementing an atomic operation according to an embodiment of the present invention.

FIG. 2 shows a flow diagram illustrating a method of implementing an atomic transaction or operation according to an embodiment of the invention. In step 210, the host 200 sends to the disk apparatus 100 one or more commands which make up the atomic transaction. These may be standard write operations, which are held in the RAM 8. In step 212, the disk apparatus 100 records the one or more commands of the atomic transaction in a log which is a nonvolatile storage to be administered by the disk apparatus 100, not by the file system of the host 200. After the disk apparatus 100 has recorded the entire atomic transaction in the log, it notifies the host 200 that the atomic operation has been committed (i.e., the atomic transaction is safely stored in nonvolatile storage) in step 214. The disk apparatus 100 then proceeds to perform the atomic operation in step 216. Upon completion of the atomic operation, the disk apparatus 100 notes in the log that the atomic operation has been successfully performed in step 218. Step 218 need not occur after each atomic operation, but will occur periodically so as to limit the recovery time upon reboot after a crash.

Step 210 can be carried out in any suitable manner. In one embodiment, the host 200 first sends an initiate-atomic-operation command to notify the disk apparatus 100 that an atomic transaction is required. This command identifies which of the subsequent commands to follow need to be executed atomically. Then the host 200 sends the one or more commands that make up the atomic transaction. A different approach is described below (see FIG. 4).

In step 212, the log for recording the atomic transaction may be any nonvolatile storage that is administered by the disk apparatus 100 and not by the host 200. One example is a log area in a special region on the surface of the disk 1. Alternatively, the log is stored in some other nonvolatile storage medium (not the disk 1) on the same device. Because the logging activities will be handled by the disk apparatus 100 and not by the host 200, there will be fewer commands issued from the host 200 to the disk apparatus 100, and the interface traffic will be reduced. Moreover, this results in simplified file system operations (since no log management is required) and reduced caching requirements on the part of the host 200 (since the cache may be cleared sooner as commands are logged on the disk apparatus 100).

After the disk apparatus 100 has recorded the entire atomic transaction in the log, it may append a note to the log that the atomic operation is committed and notify the host 200. Once the atomic operation has been committed, the disk apparatus 100 can perform the one or more commands in the atomic operation (in step 216) without the need to communicate with the host 200 (referred to as de-staging). Significantly, the disk apparatus 100 can distinguish between the one or more commands that are logged (committed) versus those that are not logged (not committed). As a result, the disk apparatus 100 can establish different priorities for the different commands (i.e., giving higher priority to commands that are not committed), and hence improve the performance seen by the host 200. For a command that is not committed, the host 200 will wait for the command to be completed by the disk apparatus 100. The higher priority will ensure that the disk apparatus 100 will perform the command more quickly as compared to the committed commands with lower priorities. In this architecture, the disk apparatus 100 can use a longer queue and obtain some advantage from sorting of commands using rotational position optimization. For instance, the disk apparatus 100 may provide different queues in the RAM 8, including higher priority queues for commands that are not committed and lower priority queues for commands that have been committed. A read command will generally be placed in a high priority queue, since the host is kept waiting during the read operation.

Figure 3:
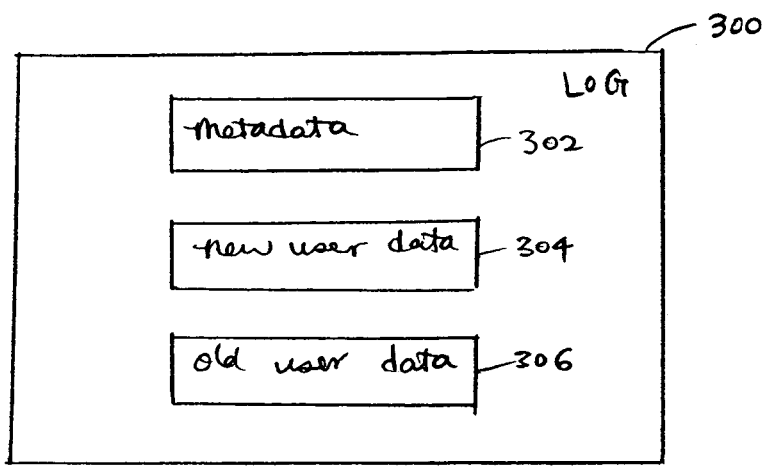
FIG. 3 is a simplified schematic diagram of a log in the hard disk drive apparatus according to an embodiment of the present invention.

FIG. 3 shows an example of a log 300 for implementing the atomic transaction. As with other forms of file system logging, there are several different types of data that may be stored in the log 300. They include, for example, metadata 302, new user data 304 for the new atomic transaction, and old user data 306 for the old atomic transaction which can be deleted or written over by new data. The metadata 302 includes file system data such as a directory structure, file names, pointers to location or sector of data, and the like. The storage of the new user data 304 in the log 300 occurs relatively quickly. If the atomic transaction involves a write operation, the data to be written to the disk 1 can be quickly stored in the log 300 by sequential writing (during step 212), which serves as a cache. This operation may be referred to as write caching, so that the disk apparatus 100 can subsequently copy the data to the disk 1 by random writing to the desired locations without the need to involve the host 200, which is more time-consuming than sequential writing into the log 300. The use of write caching in the log 300 as a form of atomic transaction improves the performance as seen by the host 200. Although it is possible for the disk apparatus 100 to copy the write data from the log 300 to the disk 1 during step 216, it is more efficient to copy the write data from the buffer or RAM 8 to the disk 1. The write data in the log 300 will serve as backup in case of power outage or some other failure that causes the data in the RAM 8 to be corrupted, deleted, or otherwise unavailable. Indeed, the log 300 allows an atomic transaction to be reconstructed and completed in the event of an interruption or failure such as power outage, and the storage of user data (e.g., write data) in the log 300 as backup serves this purpose.

Depending on the choice, the disk apparatus 100 may guarantee different forms of atomicity. The disk apparatus 100 may guarantee only that the file system metadata 302 be self-consistent. In case of a failure, the disk apparatus 100 can rely on the data stored in the nonvolatile log 300 to start the atomic transaction from the beginning and complete the metadata part of the transaction upon recovery. Alternatively, the disk apparatus 100 may guarantee that the metadata 302 and the new user data 304 be self-consistent. In that case, during recovery from a failure, the disk apparatus 100 may restart from the point of failure and roll forward the complete the atomic transaction, including the user data changes. If the old user data 306 is also stored in the log 300, the disk apparatus 100 may also roll backward from the atomic transaction and restore the disk to the previous state prior to commencing the atomic transaction. Thus, the atomic transaction in this case become reversible.

If necessary, commands that are part of a specific atomic operation can be interleaved with commands that are not. For example, the disk apparatus 100 may be connected with a plurality of hosts and receive commands from them. The disk apparatus 100 can identify the interleaved commands, and separate them into different queues or direct them to different storage areas, so that all the commands that make up the same atomic transaction are stored in a proper area of the log 300. It is also noted that the atomic transaction may include only one command. For instance, a command may involve writing to a large number of sectors on the disk 1. By specifying the command as an atomic transaction, the write operation will not be left partially completed in the event of a failure.

Because the disk apparatus 100 implements a log 300 for atomic transactions, the file system in the host 200 will no longer need to perform journaling functions. Therefore, the changes to the disk apparatus as described will need to be defined in a standards organization, so that the new disk apparatus functionality can be effectively used by the new file systems. The atomic operation may be implemented using slight modification to existing standards, such as the SCSI standard shown in FIG. 4 and described below.

A small enhancement to the semantics of linked commands in SCSI HDDs can be used to provide the type of atomicity described above. Linked commands are a little used feature of the SCSI standard whereby multiple arbitrary commands can be executed as a single I/O process in the disk drive. A "link" bit is set in the SCSI Command Descriptor Block (CDB) to indicate that a command has following parts. The HDD is supposed to execute this command and all following parts as a single process, executing each subsequent command in turn until a command is fetched which does not have the link bit set.

Figure 4:
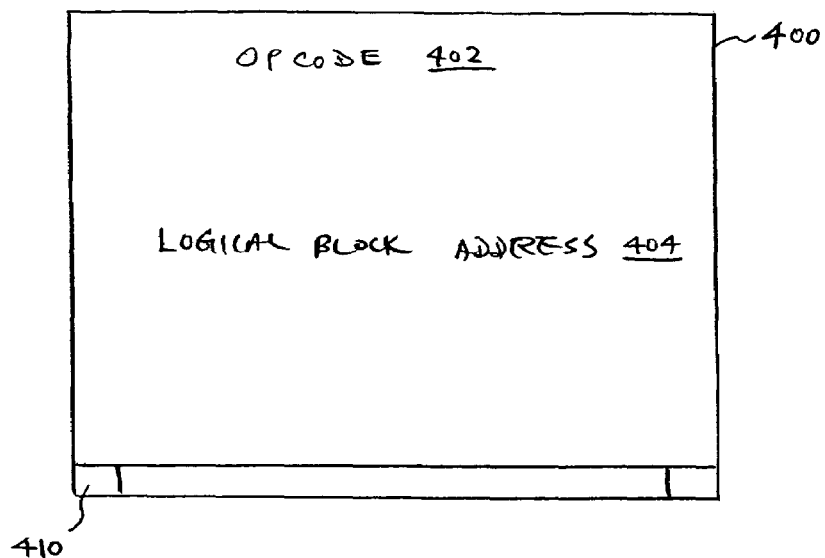
FIG. 4 is a simplified diagram of a SCSI Command Descriptor Block (CDB) for implementing the atomic operation according to an embodiment of the present invention.

FIG. 4 shows an example of a SCSI CDB 400 which includes, among others, an OPCODE field 402, a command specific parameters area 404, and a link bit 410 which can be "0" or "1" and is located in the control field. When the link bit 410 is 0, the command is not linked. When the link bit 410 is set to 1, the command is linked to subsequent commands for which the link bit 410 may be 0 or 1. The commands that are "linked" make up an atomic transaction to be performed in full or not at all.

A series of commands that should be executed atomically might be a write of customer data that is journaled in the HDD. This command sequence should result in writing new data to the disk drive and updating the file system metadata in such a way that the file system would remain consistent, or doing neither if any part of the sequence failed. The result is a consistent file system with either the new data or the old data still in tact. A "good" status is returned if the sequence succeeds. Either a "no" status or a "failed" status is returned if a failure due to power outage or the like has occurred.

The journaled write operation, for instance, would include a write of customer data and one or more writes of the file system metadata. The desired behavior is that either both the customer data and file system metadata should be completely and correctly written and a good status is returned, or that neither should be written and the file system would be left unchanged and either a no status or a failed status is returned.

In this particular example involving a write operation, the desired semantics of a linked set of commands are as follows:

1. A write CDB (400 in FIG. 4) for customer data is sent to the HDD (the disk apparatus 100 in FIG. 1) with the link bit 410 set (to 1) in the CDB. This is part of step 210 in FIG. 2.
2. The HDD fetches the customer data and write the data to a log (300 in FIG. 3) outside the normal Command Specific Parameters area (customer) on the disk drive. A return status of INTERMEDIATE-CONDITION MET is issued by the HDD. The data is maintained in the HDD cache (the RAM 8 in FIG. 1). This is part of step 212.
3. Zero or more write CDBs for file system metadata are sent to the HDD with the link bit set. This is part of step 210.
4. The HDD fetches the file system metadata and journal it in the log with the customer data from step 1 above. This is part of step 212. Desirably, an INTERMEDIATE-CONDITION MET status is returned for each CDB.
5. The last file system write CDB is issued to the HDD with the link bit not set (to 0). This is part of step 210.
6. The HDD fetches the file system metadata and journal it in the log with the other data above. This is part of step 212.
7. The HDD journals the old file system and customer data with the journaled new data from above, and marks this journal "complete and open." This indicates that the atomic operation is committed. The HDD may notify the host that the atomic operation is committed, as in step 214 in FIG. 2.
8. The HDD writes the new file system and customer data which have been journaled to the final file location on the disk. The source of this data desirably is the HDD cache (the RAM 8) instead of the log (300) unless the data in the RAM 8 is corrupted or otherwise unavailable. This constitutes step 216.
9. The HDD changes the "complete and open" journal entry to "closed," and the HDD cache (the RAM 8) is freed. This is step 218.

The HDD returns status for each of the above steps immediately upon writing the journal entry. This should happen very quickly since the disk drive will maintain its actuator in the journal region through the entire process. The final write to both the customer and file system will take place from the HDD cache buffer 8 where all the data has been maintained. The journal copy in the log 300 is only used as backup for recovery. During this entire process including multiple commands, the disk drive does not execute any other commands that overlap the Command Specific Parameters area in any journaled command. This is what is meant by the sequence is executed as a single I/O process in the HDD and is the defined SCSI semantics for linked commands. A bit in the Vendor Unique Mode page (page 0) can be used to enable/disable or poll the availability of these semantics.

If any part of the write fails, the CHECK CONDITION STATUS is returned and a REQUEST SENSE command will return the appropriate SCSI status information describing the error.

If the power fails or some other catastrophic error occurs which prevents the disk drive from returning the status, then upon power up or after a unit start command, the HDD will recover as follows:

1. If there are no "complete and open" journal entries, then no recovery is needed.
2. If the drive finds any "complete and open" journal entry, then it will transfer the data to the final location for that journal entry and mark the entry "closed."

Figure 5:
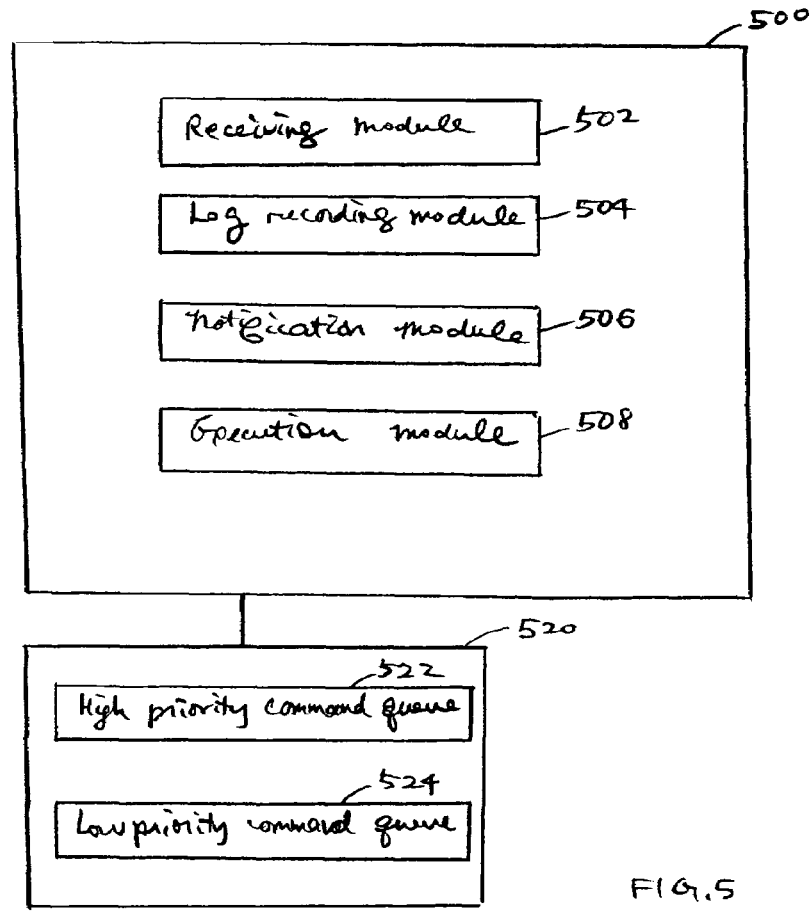
FIG. 5 is a simplified block diagram of a disk controller and a buffer according to an embodiment of the present invention.

The disk controller 4 of FIG. 1 may be configured in hardware and/or software to perform the tasks to carry out the atomic transaction as well as other non-atomic commands. FIG. 5 shows an example of a data storage controller such as a disk controller 500 which includes a receiving module 502, a log recording module 504, a notification module 506, and an execution module 508. The receiving module 502 receives from the host 200 commands and data, including one or more commands that make up an atomic transaction. The receiving module 502 can recognize which commands are part of an atomic transaction, for instance, by receiving an initiate-atomic-operation command from the host 200 or by detecting the link bit in the commands. The log recording module 504 records the one or more commands of the atomic transaction in the log 300. The log recording module 504 further updates and modifies information in the log 300 during the process of performing the atomic transaction. The notification module 506 notifies the host 200 that the atomic transaction is committed after all of the one or more commands of the atomic transaction are recorded in the log 300. The execution module 508 performs various commands, including the one or more commands of the atomic transaction in full or not at all.

FIG. 5 further shows a buffer or RAM 520 including a high priority command queue 522 and a low priority command queue 524. As discussed above, the committed commands of an atomic transaction may be placed in the low priority command queue 524, while the commands that are not committed may be placed in the high priority command queue 522. FIG. 5 merely shows one example. In general, there may be more than two priorities.

It is to be understood that the above description is intended to be illustrative and not restrictive. Many embodiments will be apparent to those of skill in the art upon reviewing the above description. For instance, sending one or more commands as an atomic transaction to the disk apparatus (step 210) can be performed using the above discussed methods or other suitable techniques. The scope of the invention should, therefore, be determined not with reference to the above description, but instead should be determined with reference to the appended claims along with their full scope of equivalents.

What is claimed is:

1. A method of implementing an atomic transaction in a data storage apparatus, the method comprising:
   receiving, from a host by the data storage apparatus, one or more commands to be executed as an atomic transaction;

recording in a nonvolatile storage, by the data storage apparatus, a log containing the one or more commands of the atomic transaction, the log to be administered by the data storage apparatus and not by the host; and performing the one or more commands of the atomic transaction by the data storage apparatus;

wherein the log is provided on a surface of a disk in the data storage apparatus.

2. The method of claim 1 further comprising, prior to receiving the one or more commands to be executed as an atomic transaction:

receiving, from the host by the data storage apparatus, an initiate-atomic-operation command identifying the one or more commands to be executed as an atomic transaction.

3. The method of claim 1 wherein the one or more commands are linked by setting a parameter in a command field of each command to link the one or more commands together as the atomic transaction to be executed in full or not at all.

4. The method of claim 3 wherein the one or more commands to be executed as an atomic transaction are each embodied in a SCSI Command Descriptor Block including a link bit which is set to link the one or more commands together as the atomic transaction.

5. The method of claim 1 wherein the log is provided in a nonvolatile storage medium in the data storage apparatus.

6. The method of claim 1 further comprising notifying the host that the atomic transaction is committed after all of the one or more commands of the atomic transaction are recorded in the log.

7. The method of claim 1 further comprising recording in the log that the atomic transaction is committed after all of the one or more commands of the atomic transaction are recorded in the log.

8. The method of claim 7 further comprising:

providing a plurality of queues of varying priorities including one or more lower priority queues and one or more higher priority queues by the data storage apparatus;

placing commands that are committed as low priority commands in the one or more lower priority queues;

placing commands that are not committed as high priority commands in the one or more higher priority queues; and performing commands in the one or more higher priority queues first before commands in the one or more lower priority queues.

9. The method of claim 1 wherein the log comprises metadata of the atomic transaction; and further comprising keeping the metadata self-consistent by the data storage apparatus.

10. The method of claim 9 wherein the log further comprises new user data of the atomic transaction; and further comprising keeping the metadata and the new user data self-consistent by the data storage apparatus.

11. The method of claim 10 wherein the log further comprises old user data which can be used to restore the data storage apparatus to a state before the atomic transaction is performed.

12. The method of claim 1 further comprising:

receiving one or more non-atomic commands that are interleaved with the one or more commands of the atomic transaction; and separating the non-atomic commands so as to record the one or more commands of the atomic transaction in the log.

13. A data storage controller for implementing an atomic transaction, the data storage controller comprising:

a receiving module configured to receive from a host one or more commands to be executed as an atomic transaction;

a log recording module, configured to record in a nonvolatile storage a log containing the one or more commands of the atomic transaction, the log to be administered by the data storage controller and not by the host; and an execution module configured to perform the one or more commands of the atomic transaction, wherein the log is provided on a surface of a disk in the data storage apparatus.

14. The data storage controller of claim 13 wherein the receiving module is configured to receive from the host, prior to receiving the one or more commands to be executed as an atomic transaction, an initiate-atomic-operation command identifying the one or more commands to be executed as an atomic transaction.

15. The data storage controller of claim 13 wherein the receiving module is configured to recognize that the one or more commands to be executed as an atomic transaction are each embodied in a SCSI Command Descriptor Block including a link bit which is set to link the one or more commands together as the atomic transaction.

16. The data storage controller of claim 13 further comprising a notification module configured to notify the host that the atomic transaction is committed after all of the one or more commands of the atomic transaction are recorded in the log.

17. The data storage controller of claim 13 wherein the log recording module is configured to record in the log that the atomic transaction is committed after all of the one or more commands of the atomic transaction are recorded in the log.

18. The data storage controller of claim 13 wherein the log comprises metadata of the atomic transaction; and the log recording module is configured to keep the metadata self-consistent.

19. The data storage controller of claim 18 wherein the log further comprises new user data of the atomic transaction; and the log recording module is configured to keep the metadata and the new user data self-consistent.

20. The data storage controller of claim 19 wherein the log further comprises old user data; and the log recording module is capable of restoring a data storage apparatus to a state using the old user data before the atomic transaction is performed.

21. The data storage controller of claim 13 wherein the receiving module is configured to receive one or more non-atomic commands that are interleaved with the one or more commands of the atomic transaction; and the log recording module is configured to record the one or more commands of the atomic transaction and not the non-atomic commands in the log.

22. A data storage apparatus comprising:

a data storage controller as recited in claim 13; and a nonvolatile storage containing the log.

23. The data storage apparatus of claim 22 further comprising a disk, and wherein the nonvolatile storage is provided on a surface of the disk.

24. The data storage apparatus of claim 22 further comprising:
  a plurality of queues of varying priorities including one or more lower priority queue and one or more higher priority queues;
  wherein the log recording module of the data storage controller is configured to record in the log that the atomic transaction is committed after all of the one or more commands of the atomic transaction are recorded in the log;
  wherein commands that are committed are placed in the one or more lower priority queues and commands that are not committed are placed in the one or more higher priority queues; and
  wherein the execution module of the data storage controller is configured to perform commands in the one or more higher priority queues first before commands in the one or more lower priority queues.

* * * * *